United States Patent
Fujiwara et al.

(10) Patent No.: US 6,962,252 B2
(45) Date of Patent: Nov. 8, 2005

(54) CURVED BELT SUPPORT APPARATUS

(75) Inventors: Hiroaki Fujiwara, Chiba (JP); Walter Niklaus Polt, Basel (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/399,159

(22) PCT Filed: Jun. 11, 2001

(86) PCT No.: PCT/EP01/06569

§ 371 (c)(1),
(2), (4) Date: Aug. 13, 2003

(87) PCT Pub. No.: WO02/30793

PCT Pub. Date: Apr. 18, 2002

(65) Prior Publication Data

US 2004/0035685 A1 Feb. 26, 2004

(30) Foreign Application Priority Data

Oct. 11, 2000 (JP) ......................... 2000-311332

(51) Int. Cl.[7] ............................. B65G 15/60
(52) U.S. Cl. ...................... 198/837; 198/831
(58) Field of Search ................. 198/831, 837

(56) References Cited

U.S. PATENT DOCUMENTS 5,944,171 A  *  8/1999  Vertogen et al. ............. 198/837

6,564,931 B1     5/2003  Edelmann

FOREIGN PATENT DOCUMENTS

| EP | 0716034 A | 6/1996 |
|---|---|---|
| EP | 0846637 A | 6/1998 |
| JP | 05-024622 | 2/1993 |
| JP | 08-133438 | 5/1996 |

* cited by examiner

Primary Examiner—Joe Dillon, Jr.
(74) Attorney, Agent, or Firm—Hodgson Russ LLP (57) ABSTRACT

The invention provides a curved belt support apparatus (300) that prevents a curved belt (200) from moving inward by supporting a thick part (220) of the curved belt that thickens in both vertical directions at the outer edge of the belt. An upper roller (370) is brought in contact with the upper inside surface (221) of the thick part (220), a lower guide roller (380) is brought in contact with the lower guide roller (380) is brought in contact with the lower inside surface (222) of the thick part (200), and the upper and lower guide rollers are elastically supported such that they can move up and down. When operated, the upper guide roller (370) and the lower guide roller (380) are moved diagonally upward and downward, respectively, in the direction of the radial inner edge of the curved belt so that the thick part (220) of the belt is released from the upper and lower guide rollers.

9 Claims, 11 Drawing Sheets

CURVED BELT SUPPORT APPARATUS

TECHNICAL FIELD

The present invention pertains to the art related to a curved conveyor around which revolves a curved belt having a beveled configuration or a round configuration, or having a beveled or round configuration with a hole therethrough. The present invention relates to a support apparatus that supports a thick part of the curved belt at the outer edge thereof and prevents the belt from moving toward the inside edge.

BACKGROUND ART

Japanese Patent Kokai publication No. Heisei 5-24622 discloses a curved belt support apparatus comprising a base located outside the curved belt, in its radial direction, a bracket mounted to the base such that it can move vertically, a fixing means to fix the position of the bracket relative to the base in a prescribed position, and guide rollers rotatably mounted to the base and the bracket, respectively. The area near the thick part of the outer circumference of the curved belt is grasped by the guide rollers on the base side and the guide rollers on the bracket side. Through this technology, the curved belt may be easily installed and removed.

Japanese Patent Kokai publication No. Heisei 8-133438 discloses a curved belt support apparatus comprising a main unit that is located outside the curved belt, in its radial direction, and at least a part of which comprises an elastic member, a pair of guide rollers movably mounted to the main unit that grasp the curved belt at the forward path side, and a pair of guide rollers movably mounted to the main unit that grasp the curved belt at the return path side. The guide rollers outside the loop become displaced slightly relative to the guide rollers inside the loop through the elastic deformation of the main unit. Through this technology, a curved conveyor having less drive resistance and a longer useful life may be provided.

DISCLOSURE OF THE INVENTION

When the technology of the first example of the prior art above is combined with the second example thereof, a technology may be imagined in which, for example, at least a part of the bracket mounted in a vertical movable fashion to the base comprises an elastic member, so that the bracket side guide roller may be displaced slightly relative to the base side guide roller through the elastic deformation of the bracket. However, in such a case, because the bracket can move only vertically in the first example of the prior art, when the curved belt is removed, the bracket side guide roller must separate from the thick part of the curved belt while residual tension is still being applied to the curved belt in the direction of the radial inner edge. Due to the high amount of contact pressure, the guide roller does not easily separate from the curved belt, making the operation difficult to perform. When the curved belt is installed, the guide rollers must be put closer to the thick part of the curved belt while initial tension is applied to the curved belt in the direction of the radial outer edge, which also makes the operation difficult to perform. In the second example of the prior art, of the pairs of guide rollers that grasp the curved belt, the guide rollers outside the loop become displaced and the guide rollers inside the loop do not become displaced. As a result, the load applied to the thick part of the curved belt at the outer edge thereof becomes uneven, shortening the useful life of the curved belt.

The present invention was designed in consideration of these points, and an object of the invention is to improve the ease of removing and installing the curved belt. Another object of the invention is to extend the useful life of the curved belt.

These objects are attained by the claimed curved belt support apparatus according to the invention by moving the pair of guide rollers that grasp the curved belt diagonally upward and diagonally downward, respectively, in the direction of the radial inner edge of the curved belt, and by making the load applied to the thick part of the curved belt uniform by elastically supporting both guide rollers such that the guide rollers may move upward and downward.

In order to attain these objects, a first invention comprises a curved belt support apparatus that prevents a curved belt from moving inward by supporting a thick part of the curved belt that thickens in both vertical directions at the outer edge of the belt, wherein an upper guide roller is brought in contact with the upper inside surface of the thick part of the belt, a lower guide roller is brought in contact with the lower inside surface of the thick part of the belt, and the upper and lower guide rollers are elastically supported such that they can move up and down; and wherein, when operated, the upper guide roller is moved diagonally upward in the direction of the radial inner edge of the curved belt while the lower guide roller is moved diagonally downward in the direction of the radial inner edge of the curved belt so that the upper and lower guide rollers are separated from the thick part of the belt.

In the support apparatus of the first invention, when the curved belt is operating, i.e., when it is revolving, the upper inside surface of the thick part of the belt is in contact with the upper guide roller and the lower inside surface of the thick part of the belt is in contact with the lower guide roller, and as a result the belt is prevented from moving in the direction of the inner edge. Because the upper and lower guide rollers are elastically supported such that they can move up and downward, the load on the thick part of the curved belt becomes uniform, thereby extending the useful life of the belt. Where the curved belt is to be removed, when an operation is performed, the upper and lower guide rollers separate from the thick part of the curved belt by virtue of the upper guide roller moving diagonally upward in the direction of the radial inner edge of the curved belt while the lower guide roller moves diagonally downward in the direction of the radial inner edge of the curved belt. Consequently, the curved belt may be removed after the residual tension on the curved belt disappears, thereby improving operating efficiency. When the curved belt is to be installed, if the thick part of the belt is inserted between the upper and lower guide rollers and the reverse operation is performed, the upper and lower guide rollers approach and come into contact with the thick part of the belt by virtue of the upper guide roller moving diagonally downward in the direction of the radial outer edge of the curved belt while the lower guide roller moves diagonally upward in the direction of the radial outer edge of the curved belt. As a result, initial tension may be applied to the curved belt naturally in this process, thereby making the curved belt easier to install.

The curved belt support apparatus of a second invention is a curved belt support apparatus according to the first invention, wherein the upper and lower guide rollers are elastically supported such that they can also move in the radial directions of the curved belt.

Through this construction, fluctuations in the load applied to the curved belt in the radial directions thereof are absorbed, thereby further extending the useful life of the belt.

A third invention involves a concept subsidiary to that of the first invention. This invention is a curved belt support apparatus that prevents a curved belt from moving inward by supporting a thick part of the curved belt that thickens in both vertical directions at the outer edge of the belt, comprising: a slider provided outside the curved belt, in its radial direction such that, when operated, the slider moves in the direction of the radial inner edge of the curved belt; upper and lower guide members provided above and below the slider, respectively; an upper arm the root end of which is connected to the slider, the top end of which extends in the direction of the radial inner edge of the curved belt beyond the upper guide member and is elastically movable up and down, and a slanted part of the upper surface of which is slanted diagonally upward in the direction of the radial inner edge of the curved belt, so that the slanted part comes into contact with the bottom surface of the upper guide member whereby its elastic return in the upward direction is regulated; a lower arm the root end of which is connected to the slider, the top end of which extends in the direction of the radial inner edge of the curved belt beyond the lower guide member and is elastically movable up and down, and a slanted part of the lower surface of which is slanted diagonally downward in the direction of the radial inner edge of the curved belt, so that the slanted part comes into contact with the top surface of the lower guide member whereby its elastic return in the downward direction is regulated; an upper guide roller provided at the top end of the upper arm so as to rotate while in contact with the upper inner surface of the thick part of the curved belt; and a lower guide roller provided at the top end of the lower arm so as to rotate while in contact with the lower inner surface of the thick part of the curved belt.

In the support apparatus of the third invention, when the curved belt is operating, i.e., when it is revolving, the upper inside surface of the thick part of the belt is in contact with the upper guide roller and the lower inside surface of the thick part of the belt is in contact with the lower guide roller, and as a result the belt is prevented from moving in the direction of the inner edge thereof. Because the upper and lower guide rollers can move upward and downward by virtue of the elastic movability of the upper arm and lower arm, the load on the thick part of the curved belt becomes uniform, thereby extending the useful life of the belt. Where the curved belt is to be removed, when an operation is performed, the slider moves in the direction of the radial inner edge of the curved belt, and as a result the part of the upper arm that is in contact with the bottom surface of the upper guide member moves in the slanted part toward the root end. Consequently, the upper guide roller moves diagonally upward in the direction of the radial inner edge of the curve belt by virtue of the elastic return of the upper arm, thereby separating from the thick part of the curved belt. At the same time, the part of the lower arm that is in contact with the top surface of the lower guide member moves in the slanted part toward the root end. Consequently, the lower guide roller moves diagonally downward in the direction of the radial inner edge of the curve belt by virtue of the elastic return of the lower arm, thereby separating from the thick part of the curved belt. Therefore, the curved belt may be removed after the residual tension on the curved belt disappears, thereby improving operating efficiency. When the curved belt is to be installed, the thick part of the belt is inserted between the upper and lower guide rollers after the slider has been moved in the direction of the radial inner edge of the curved belt, and the reverse operation is thereafter performed. When this is done, because the slider moves in the direction of the radial outer edge of the curved belt and as a result the part of the upper arm that is in contact with the bottom surface of the upper guide member moves in the slanted area toward the top end, the upper guide roller approaches and comes into contact with the thick part of the belt by moving diagonally downward in the direction of the radial outer edge of the curved belt. At the same time, the part of the lower arm that is in contact with the top surface of the lower guide member moves in the slanted area toward the top end, so that the lower guide roller approaches and comes into contact with the thick part of the belt by moving diagonally upward in the direction of the radial outer edge of the curved belt. As a result, initial tension may be applied to the curved belt naturally in this process, thereby making the curved belt easier to install.

An advantageous embodiment of the curved belt support apparatus according to the third invention is a curved belt support apparatus, wherein the slider comprises a body member that, when operated, moves in the direction of the radial inner edge of the curved belt, a movable member movably provided on the body member so as to be movable in the radial directions of the curved belt, and an elastic member provided between the body member and the movable member. Preferably, the elastic member is a coil spring.

Through the above construction, the movable member moves in the radial directions relative to the body member due to the elastic deformation of the elastic member, so that the upper and lower guide rollers move in the radial directions of the curved belt as a result, and therefore fluctuations in the load applied in the radial directions of the curved belt are absorbed and the useful life of the curved belt is prolonged.

An alternative advantageous embodiment of the curved belt support apparatus according to the third invention is a curved belt support apparatus comprising a body member which is movable in the radial direction of the curved belt, through which the slider passes and to which the upper guide member and the lower guide member are linked; and comprising an elastic member pretensioning the body member in the direction away from the curved belt. Preferably, the elastic member is a stack of conical spring washers or a coil spring and the upper guide member and the lower guide member are integrally formed with the body member.

Through the above construction, the body member can move in the radial directions due to the elastic deformation of the elastic member, so that the upper and lower guide rollers can move in the radial directions of the curved belt as a result, and therefore fluctuations in the load applied in the radial directions of the curved belt are absorbed and the useful life of the curved belt is prolonged.

Advantageously, the upper and lower arms are linked at the root ends thereof in the curved belt support apparatus according to the third invention.

Through the above construction, because the mounting and removal of the upper and lower arms to the slider are performed in a single operation, it is a simple matter to exchange the upper arm and lower arm.

DETAILED DESCRIPTION OF THE PREFERRED EMBODIMENTS

Figure 1:
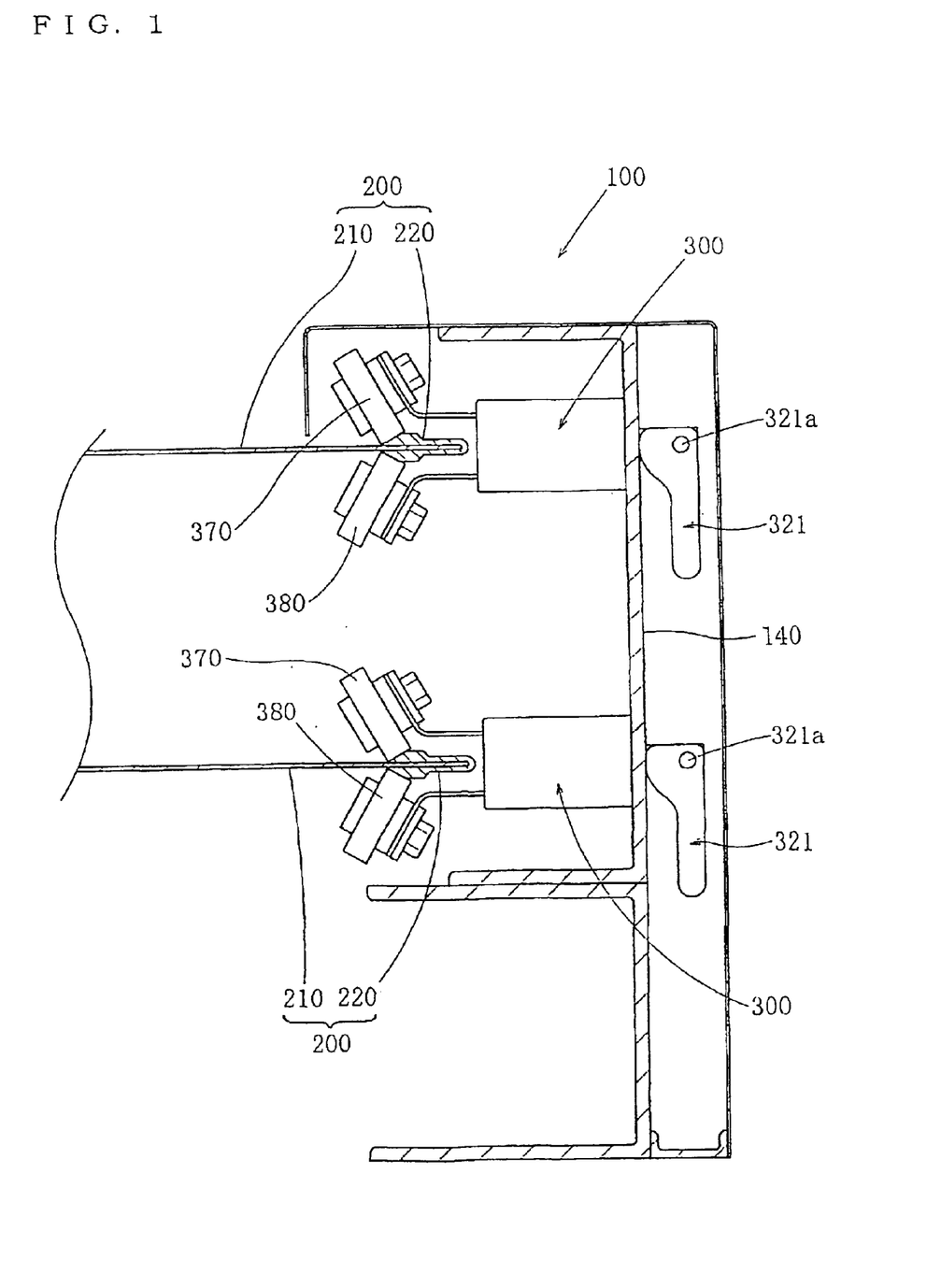
FIG. 1 is a vertical cross-section of a curved conveyor having a curved belt support apparatus according to a first embodiment.
Figure 2:
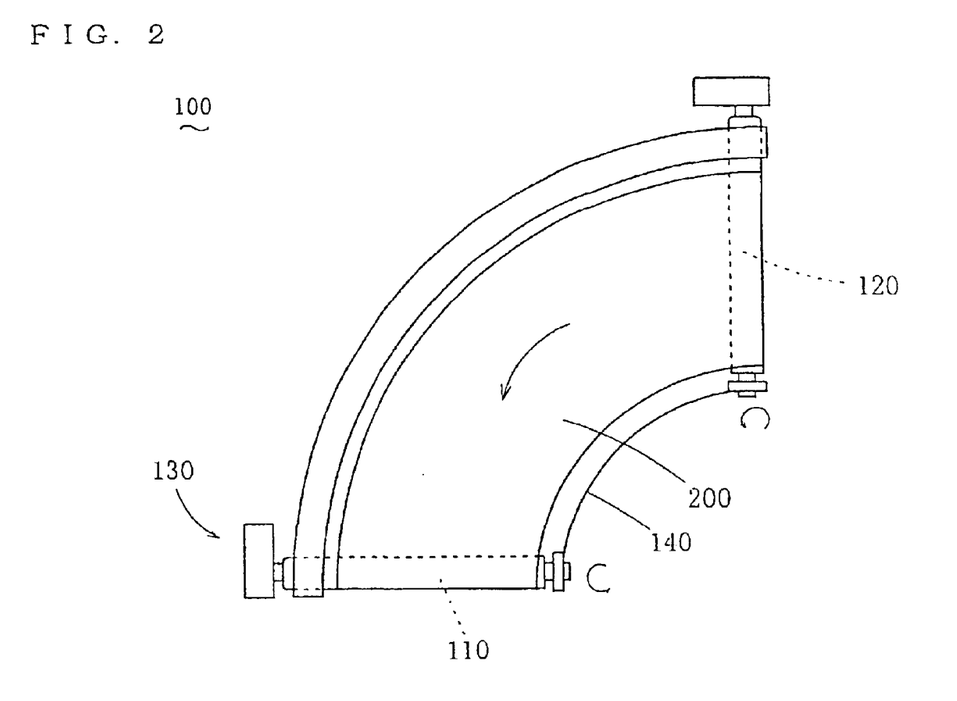
FIG. 2 is a scaled-down plan view of said curved conveyor.
Figure 3:
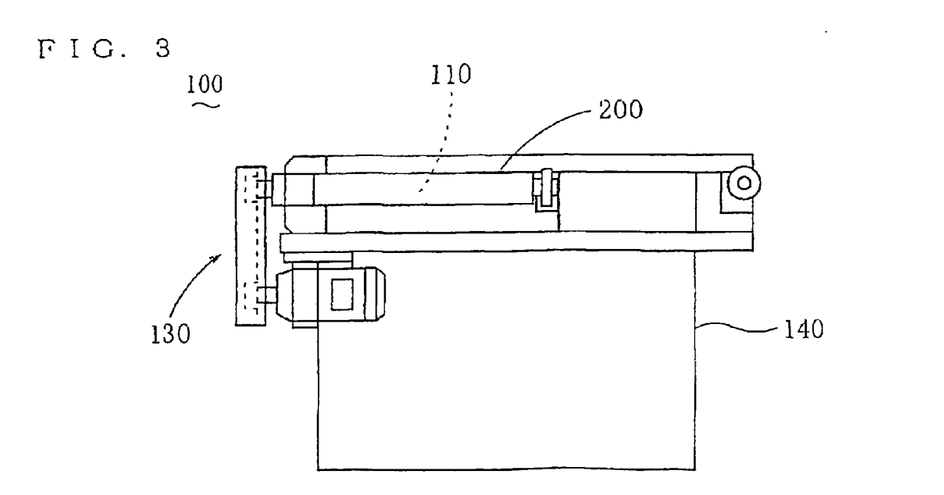
FIG. 3 is a scaled-down front view of said curved conveyor.

Embodiments of the curved belt support apparatus of the present invention will be explained below. FIGS. 1 through 3 show a curved conveyor 100 having a curved belt support apparatus of the first embodiment. In the drawings, 110 and 120 are conical or truncated conical or cylindrical rollers that rotate on an essentially horizontal axis and are angled relative to each other such that they form a V when viewed from above. A curved belt 200 is wound around these rollers 110 and 120. The curved belt 200 has a beveled configuration or a round configuration, or a beveled or round configuration with a hole therethrough. When the curved belt 200 is wound around the rollers 110 and 120, it forms a semi-circular conveyance surface when viewed from above. The rollers 110 and 120 rotate based on drive power from a drive mechanism 130 comprising an electric motor, a reduction mechanism, etc. and this rotation causes the curved belt 200 to revolve and advance the conveyance surface.

Figure 4:
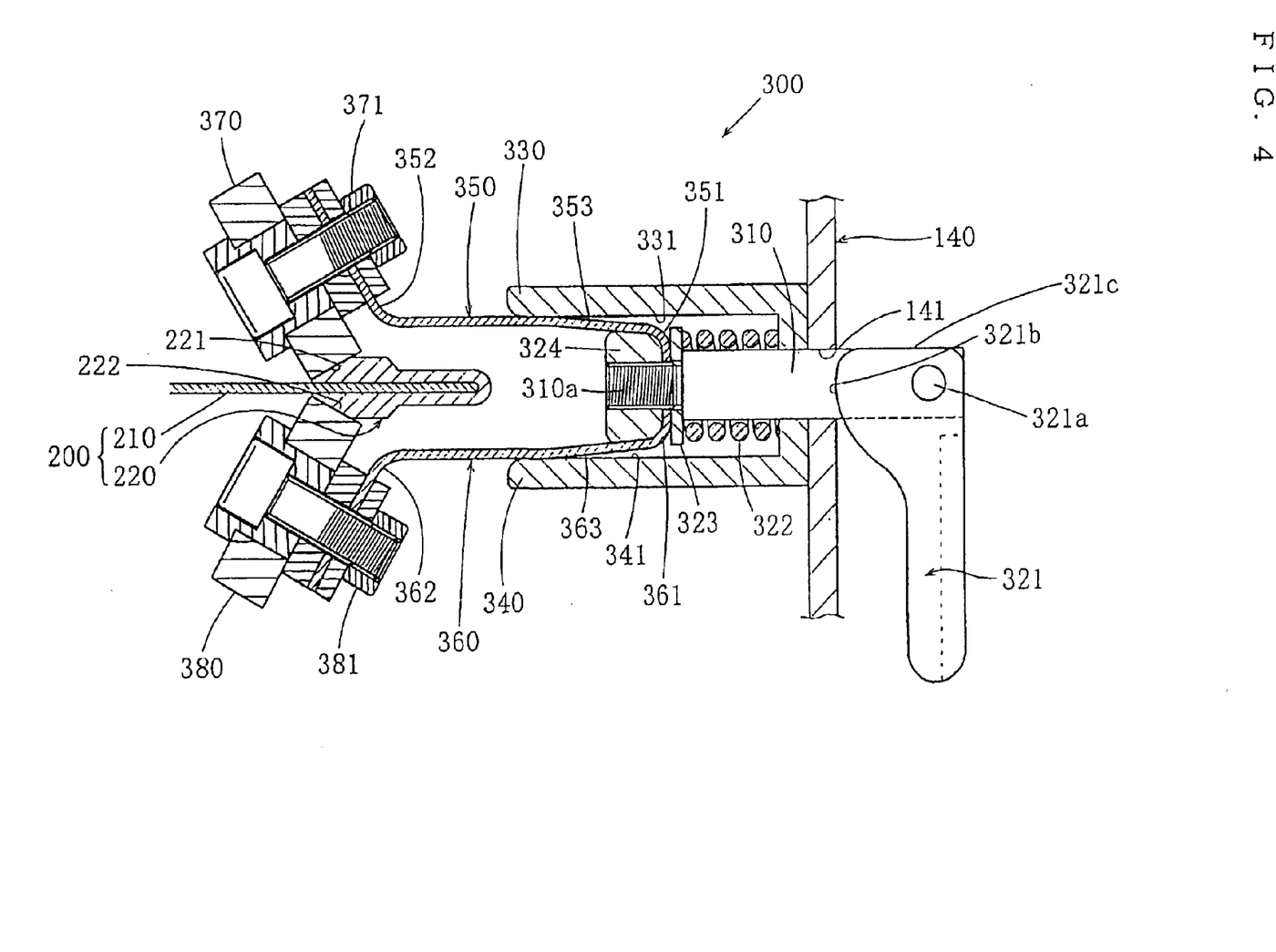
FIG. 4 is an enlarged vertical cross-section of said support apparatus when the curved conveyor is moving.

As shown in FIG. 4, the curved belt 200 has a flat surface 210 comprising a base material formed from sail fabric, for example, and an additional layer formed on the surface of the base material from polymeric resin, preferably thermoplastic resin, and the conveyance surface comprises this additional layer of the flat surface 210. A thick part 220 is formed across the entire outer edge area of the curved belt 200. The thick part 220 is thicker than the rest of the curved belt 200 on both the top and bottom surfaces, and the top side part and bottom side part are essentially symmetrical across a horizontal plane. The upper inner side surface 221 of the thick part 220 is oriented diagonally upward facing the radial inner edge of the curved belt 200, while the lower inner side surface 222 is oriented diagonally downward facing the radial inner edge of the curved belt 200. The curved conveyor 100 includes support apparatuses 300 that support the thick part 220 and prevent it from moving in the direction of the radial inner edge of the curved belt 200. As shown in FIG. 1, the support apparatuses 300 are located on the conveyance side of the curved belt 200 and on the return side positioned on the underside thereof, respectively, and appropriate gaps are located at multiple locations in the circumferential direction on both sides of the curved belt at the outer edge area thereof. All support apparatuses 300 have the same construction.

Each support apparatus 300 brings the upper guide roller 370 into contact with the upper inner side surface 221 of the thick part 220 of the curved belt 200, brings the lower guide roller 380 into contact with the lower inner side surface 222, and elastically supports the upper guide roller 370 and the lower guide roller 380 so as to enable them to move up and down. When an operation is received, the upper guide roller 370 and lower guide roller 380 separate from the thick part 220 by virtue of the upper guide roller 370 moving diagonally upward in the direction of the radial inner edge of the curved belt while the lower guide roller 380 moves diagonally downward in the direction of the radial inner edge of the curved belt.

Specifically, as shown in FIGS. 4 through 7, each support apparatus 300 comprises a slider 310 located in a frame 140 mounted outside the curved belt 200, in its radial direction in the curved conveyor 100, an upper guide member 330 and a lower guide member 340 also located in the frame 140, an upper arm 350 and a lower arm 360 linked to the slider 310, an upper guide roller 370 mounted to the upper arm 350, and a lower guide roller 380 mounted to the lower arm 360.

Figure 5:
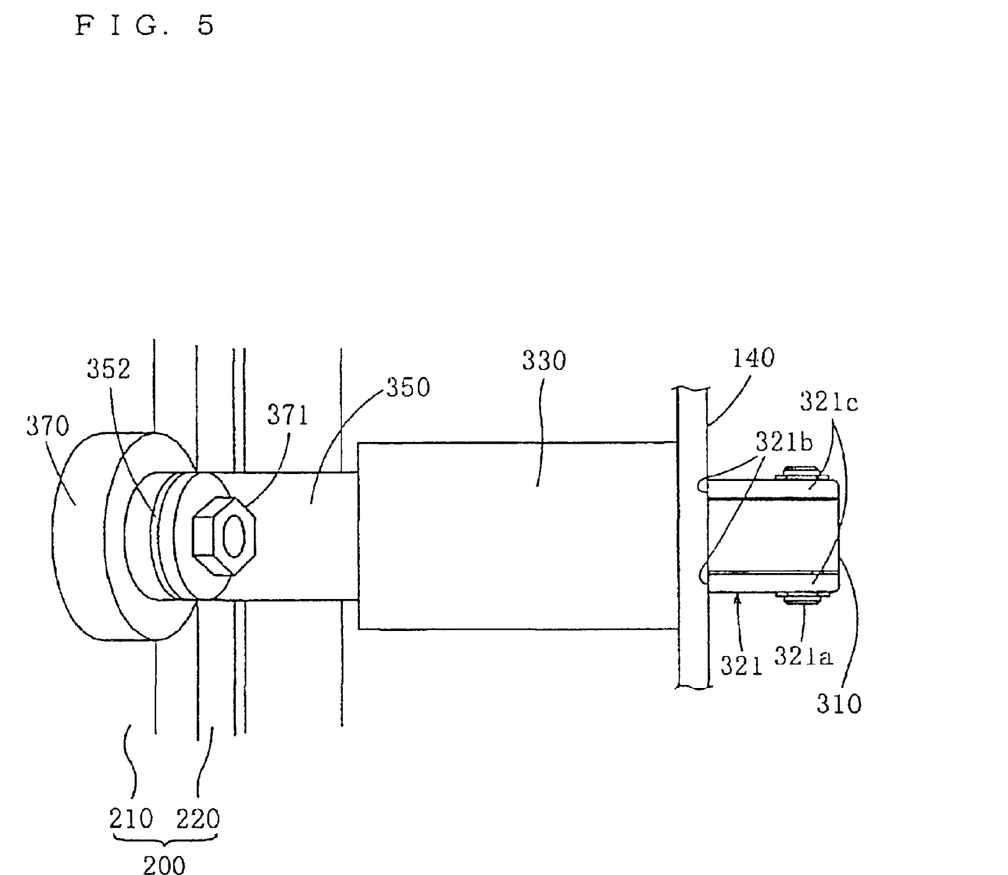
FIG. 5 is an enlarged plan view of said support apparatus.
Figure 6:
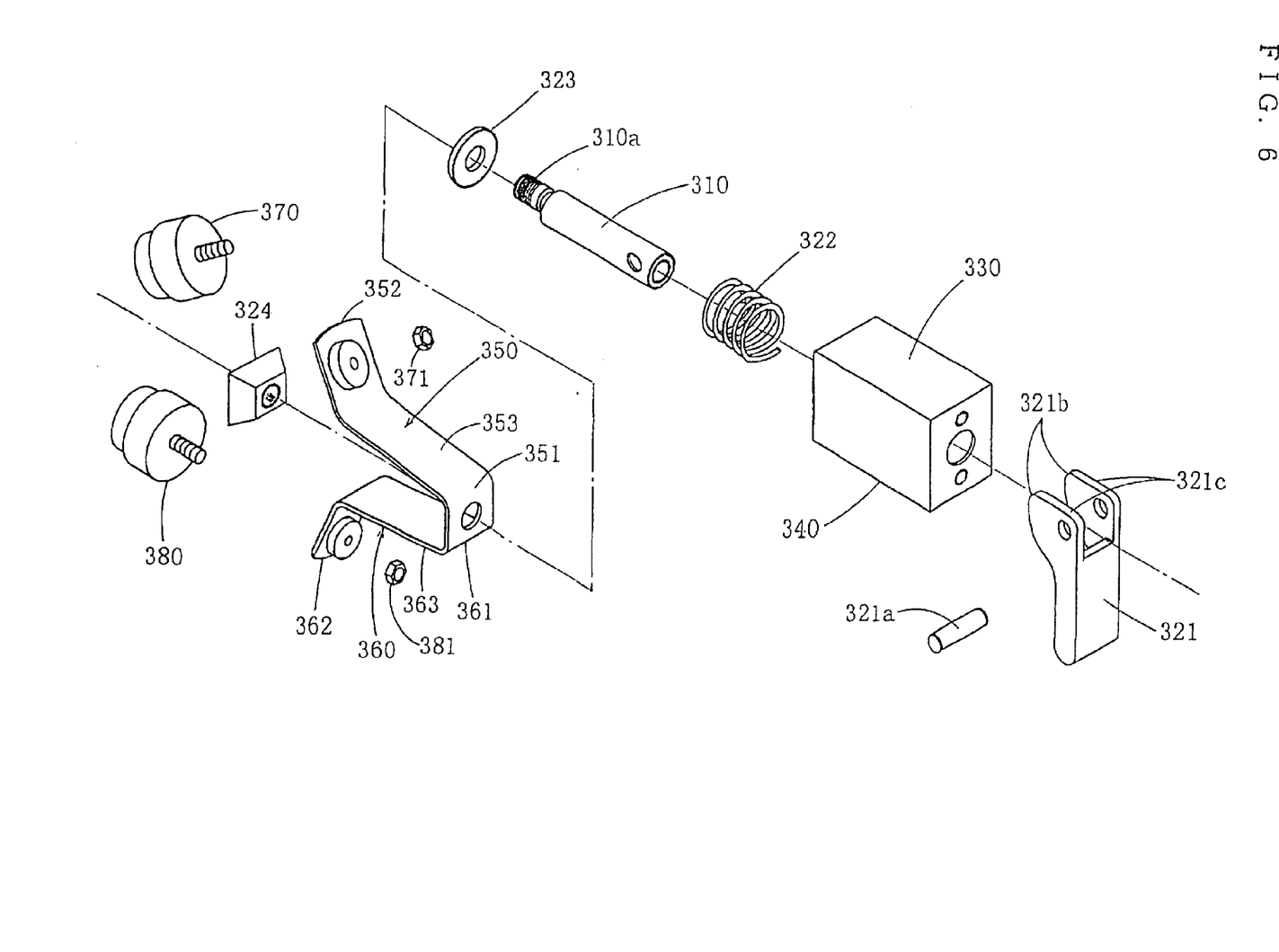
FIG. 6 is a perspective view of said support apparatus in a disassembled state.

The slider 310 passes through a through hole 141 that is drilled through the frame 140 in the radial direction of the curved belt 200, and can move in both radial directions of the curved belt 200. An operation lever 321 is rotatably mounted to the part of the slider 310 that extends outside the radial outer edge of the curved belt 200 beyond the frame 140, such that it revolves around a rotation shaft 321a that is perpendicular to the radial direction of the curved belt 200. A cam surface that comes into contact with the frame 140 is located on the operation lever 321. The cam surface has a first cam surface 321b and a second cam surface 321c that is contiguous with the first cam surface 321b and is closer to the rotation shaft 321a than the first cam surface 321b. When the curved conveyor 100 is moving, the first cam surface 321b is in contact with the frame 140, while when the operation lever 321 is operated by being rotated in order to remove or install the curved belt 200, the second cam surface 321c comes into contact with the frame 140, and the slider 310 moves in the direction of the radial inner edge of the curved belt 200. A force-applying member 322 is mounted between the slider 310 and the frame 140, and assists in the movement of the slider 310 in the direction of the radial inner edge of the curved belt 200. In this embodiment, the force-applying member is a coil spring that engages with the outer surface of the slider 310 and is mounted between the frame 140 and a washer 323 described below.

The upper guide member 330 is formed essentially in the shape of a horizontal plate having an essentially flat bottom surface 331, and is located above the slider 310. Similarly, the lower guide member 340 is formed essentially in the shape of a horizontal plate having an essentially flat top surface 341, and is located below the slider 310. The guide members 330 and 340 are both fixed to the frame 140. The guide members 330 and 340 may be integrally formed in a box-like configuration as shown in the drawings, or they may be formed independently from each other.

It is acceptable if at least part of the upper arm 350 and the lower arm 360 is formed as an elastic member. In this embodiment, the upper arm 350 and the lower arm 360 are formed as plate springs. The root end 351 of the upper arm 350 is connected to the slider 310, while the top end 352 extends farther than the upper guide member 330 in the direction of the radial inner edge of the curved belt 200, and as a result, the upper arm 350 is elastically movable up and down with the root end 351 acting as the fulcrum. A slanted part 353 of the upper surface of the upper arm 350 is slanted diagonally upward such that it faces the radial inner edge of the curved belt 200, and the upward elastic return of the upper arm 350 is regulated by the contact between this slanted part 353 and the lower surface 331 of the upper guide member 330.

The root end 361 of the lower arm 360 is also connected to the slider 310, while the top end 362 extends farther than the lower guide member 340 in the direction of the radial inner edge of the curved belt 200, and as a result, the lower arm 360 is elastically movable up and down with the root end 361 acting as the fulcrum. A slanted part 363 of the lower surface of the lower arm 360 is slanted diagonally downward such that it faces the radial inner edge of the curved belt 200, and the downward elastic return of the lower arm 360 is regulated by the contact between this slanted part 363 and the upper surface 341 of the lower guide member 340.

In this embodiment, the upper arm 350 and the lower arm 360 are connected at the root ends 351 and 361, respectively, so that the upper and lower arms are integrally formed. The upper arm 350 and the lower arm 360 are detachably connected to the slider 310 via a screw. In this embodiment, a male screw 310a is formed in the top end of the slider 310, and after a washer 323 is slid over the male screw 310a and a through hole formed in the connection area of the root ends 351 and 361 of the upper arm 350 and lower arm 360 passes over the male screw 310a, a nut 324 tightens over the male screw 310a.

The upper guide roller 370 is mounted to the top end 352 of the upper arm 350 such that it is in rotatable contact with the upper inner side surface 221 of the thick part 220. The lower guide roller 380 is mounted to the top end 362 of the lower arm 360 such that it is in rotatable contact with the lower inner side surface 222 of the thick part 220. The rotation axes for these guide rollers 370 and 380 comprise axes that extend upward and downward perpendicular to the conveyance surface, or axes which are slanted by an angle smaller than 90 degrees in the direction of the outer edge of the conveyance surface relative to the above perpendicular axes, respectively. When this is done, the circumferential surfaces of the guide rollers 370 and 380 come into contact with the inner side surfaces of the thick part 220 of the curved belt 200, enabling the movement of the curved belt 200 in the direction of the radial inner edge to be prevented. 371 and 381 are nuts to fix the upper guide roller 370 and 380, respectively.

Figure 7:
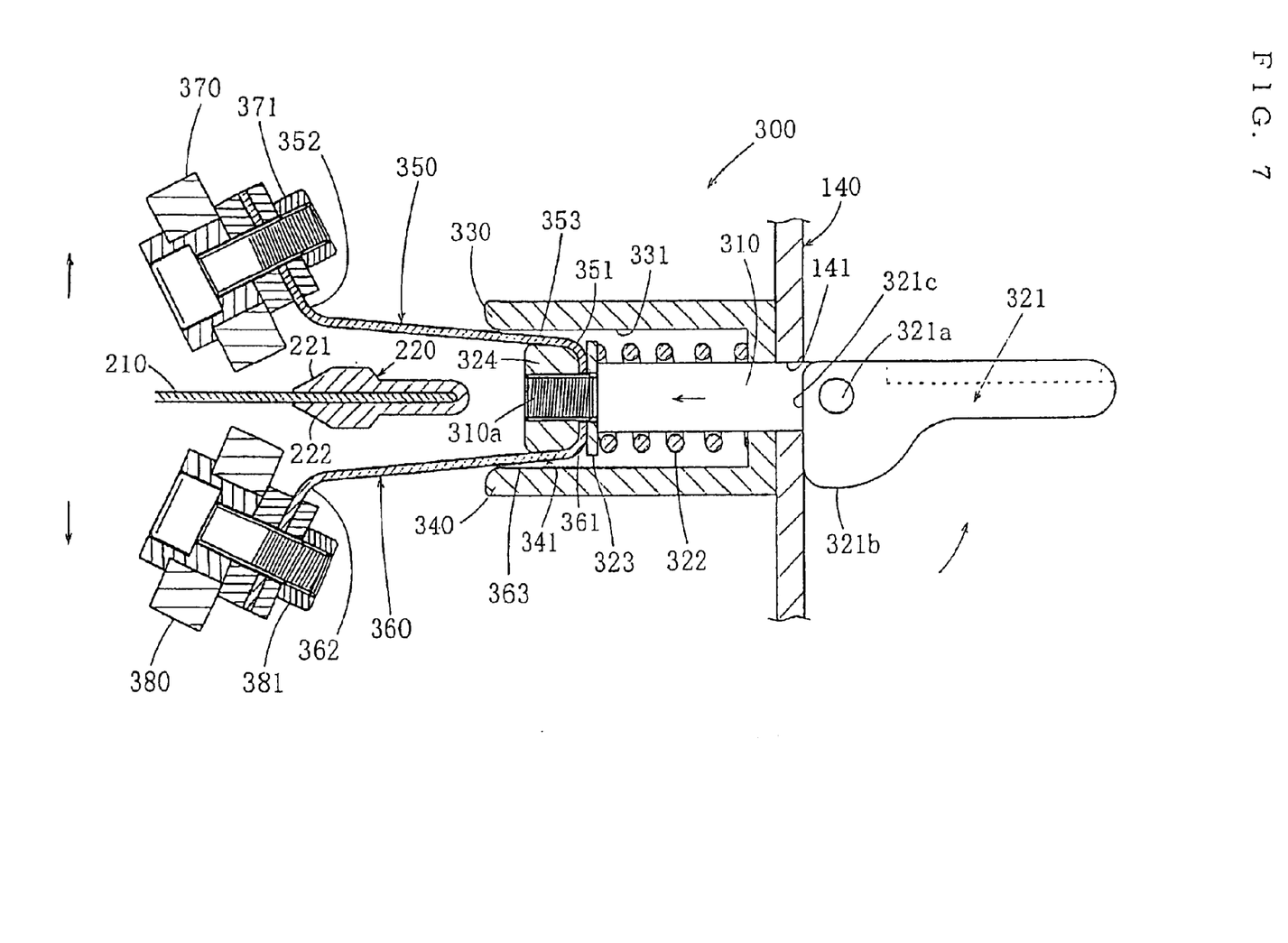
FIG. 7 is an enlarged vertical cross-section of said support apparatus during removal and installation of the curved belt.

In the first embodiment described above, when the curved belt 200 is operating, i.e., when it is revolving, the upper guide roller 370 comes into contact with the upper inner side surface 221 of the thick part 220 and the lower guide roller 380 comes into contact with the lower inner side surface 222 of the thick part 220, as shown in FIG. 4, and therefore movement of the curved belt 200 in the direction of the radial inner edge thereof is prevented. Because the upper guide roller 370 and the lower guide roller 380 move up and down due to the elastic movement of the upper arm 350 and the lower arm 360, respectively, the load applied to the thick part 220 of the curved belt 200 is made uniform and the useful life of the curved belt 200 is extended.

Where the curved belt 200 is to be removed, when the operation lever 321 is operated to rotate, the slider 310 moves in the direction of the radial inner edge of the curved belt 200 and the part of the upper arm 350 that comes into contact with the upper guide member bottom surface 331 moves in the slanted part 353 toward the root end, as shown in FIG. 7, and as a result the upper guide roller 370 moves diagonally upward in the direction of the radial inner edge of the curved belt through the elastic return of the upper arm 350, thereby separating from the thick part 220. At the same time, the part of the lower arm 360 that comes into contact with the lower guide member top surface 341 moves in the slanted part 363 toward the root end, and as a result the lower guide roller 380 moves diagonally downward in the direction of the radial inner edge of the curved belt through the elastic return of the lower arm 360, thereby separating from the thick part 220. As a result, the curved belt 200 may be removed after the residual tension on the curved belt 200 disappears, and operability is improved.

Where the curved belt 200 is to be installed, the thick part 220 of the curved belt 200 is inserted between the upper and lower guide rollers 370 and 380 after the slider 310 has been moved in the direction of the radial inner edge of the curved belt 200, and the reverse operation is thereafter performed. When this is done, the slider 310 moves in the direction of the radial outer edge of the curved belt 220, and as a result the part of the upper arm 350 that is in contact with the upper guide member bottom surface 331 moves in the slanted area 353 toward the top end, so that the upper guide roller 370 approaches the thick part 220 and comes into contact with the top inner side surface 221 by virtue of moving diagonally downward in the direction of the radial outer edge of the curved belt. At the same time, the part of the lower arm 360 that is in contact with the lower guide member top surface 341 moves in the slanted area 363 toward the top end side, so that the lower guide roller 380 approaches the thick part 220 and comes into contact with the lower inner side surface 222 by virtue of moving diagonally upward in the direction of the radial outer edge of the curved belt. As a result, initial tension may be applied to the curved belt 200 naturally in this process, thereby making the curved belt 200 easier to install.

The present invention includes an embodiment in which the upper arm and lower arm are independent members, but where the upper arm 350 and lower arm 360 are connected at their respective root ends as in the above embodiment, the mounting and removal of the upper arm 350 and the lower arm 360 to and from the slider 310 are carried out in a single operation, so that the upper arm 350 and the lower arm 360 may be easily exchanged.

The present invention includes an embodiment in which the upper arm and lower arm are fixed to the slider, but where the upper arm 350 and lower arm 360 are detachably mounted to the slider 310 as in the above embodiment, an upper arm 350 and a lower arm 360 each having the optimal spring constant, etc. for the intended use, which offers improved convenience.

FIGS. 8 through 11 show a curved conveyor 100 having a curved belt support apparatus 300' of a second embodiment. Members serving the same functions as those in the first embodiment are assigned the same numbers. The explanation of the first embodiment applies in principle, and only the points that differ will be described below. The support apparatus 300' of this embodiment elastically supports the upper guide roller 370 and the lower guide roller 380 such that they can also move in the radial directions of the curved belt 200.

Figure 8:
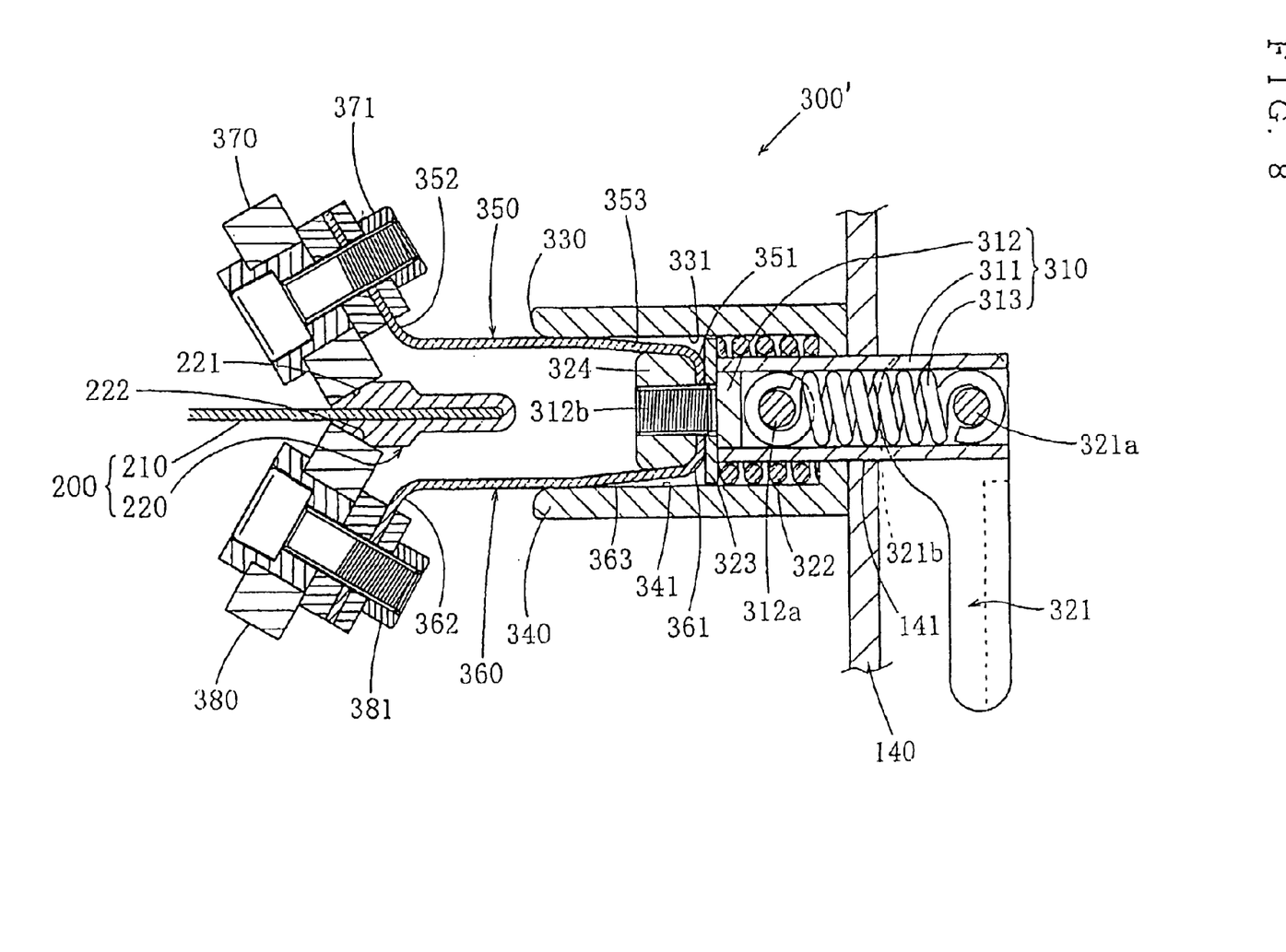
FIG. 8 is an enlarged vertical cross-section of a support apparatus according to a second embodiment when the curved conveyor is moving.
Figure 9:
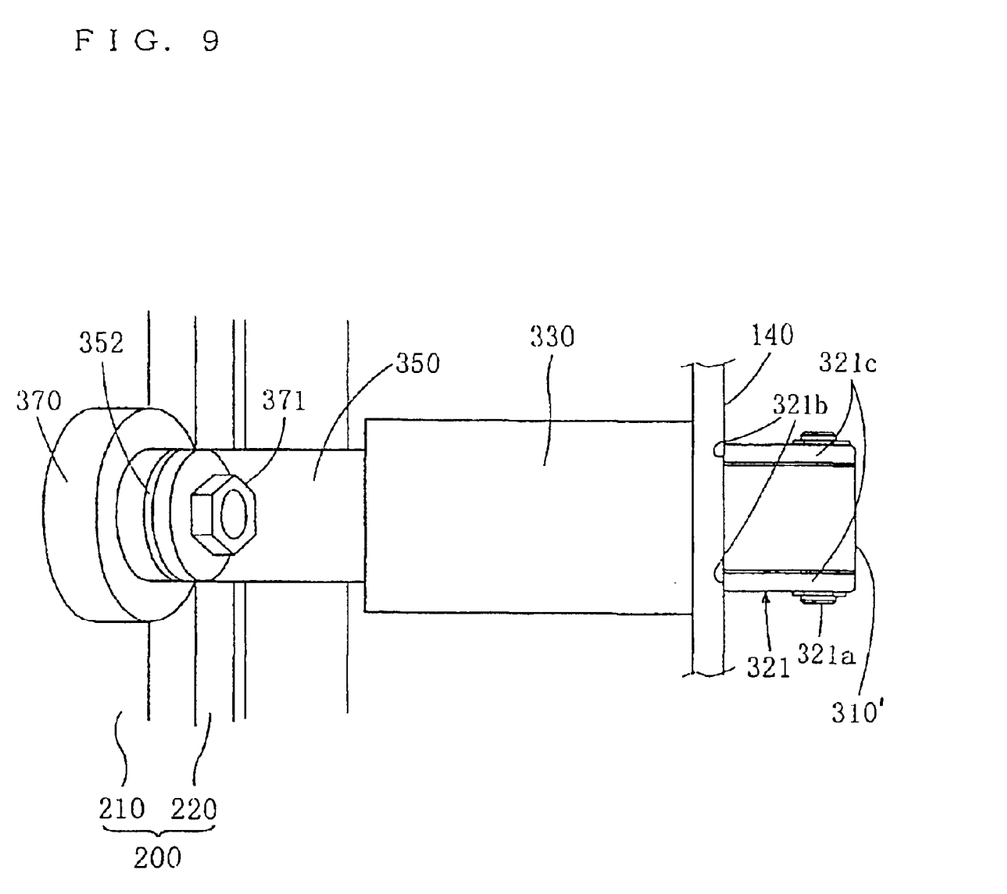
FIG. 9 is an enlarged plan view of the support apparatus of the second embodiment.
Figure 10:
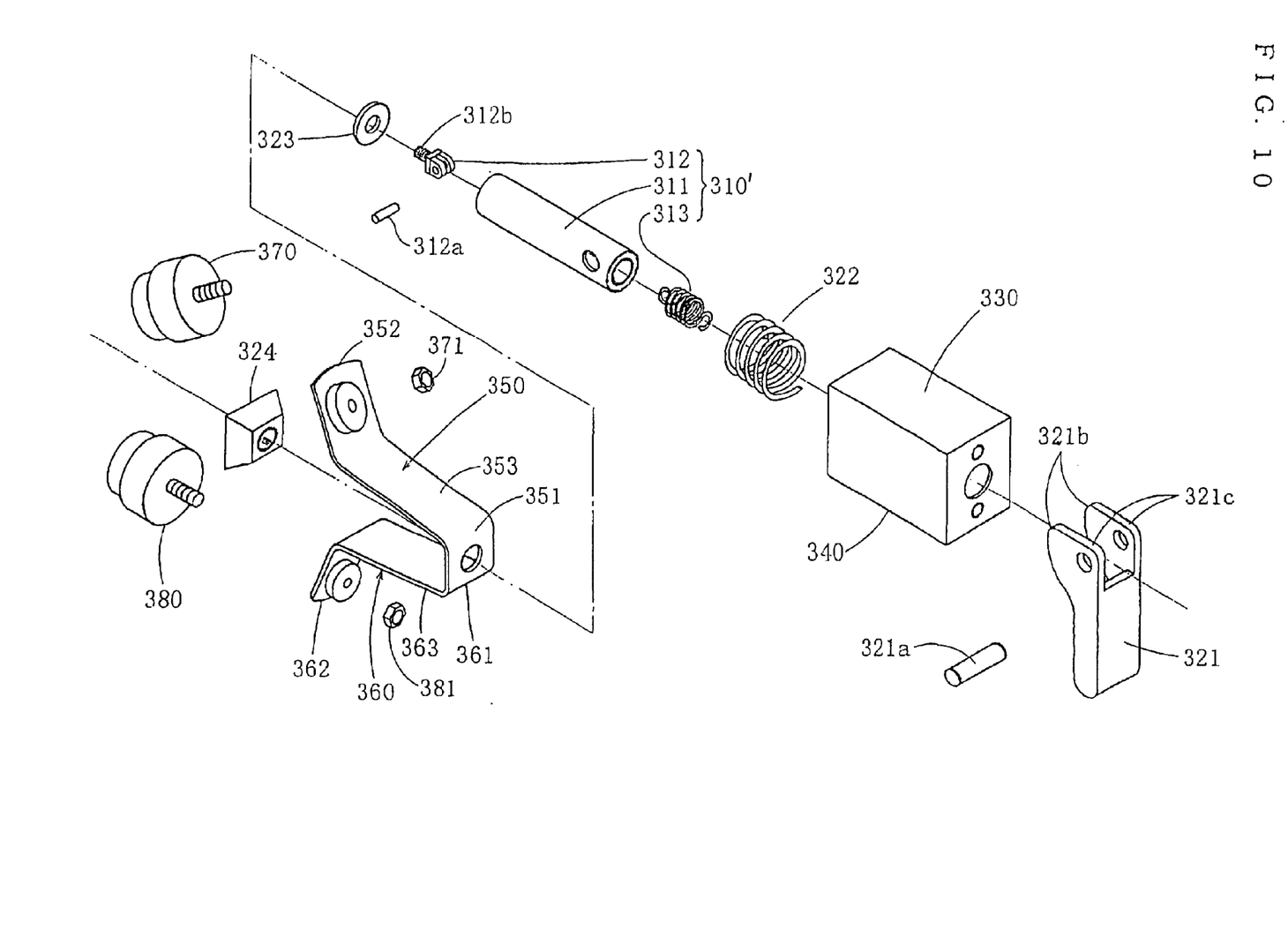
FIG. 10 is a perspective view of the support apparatus of the second embodiment in a disassembled state.
Figure 11:
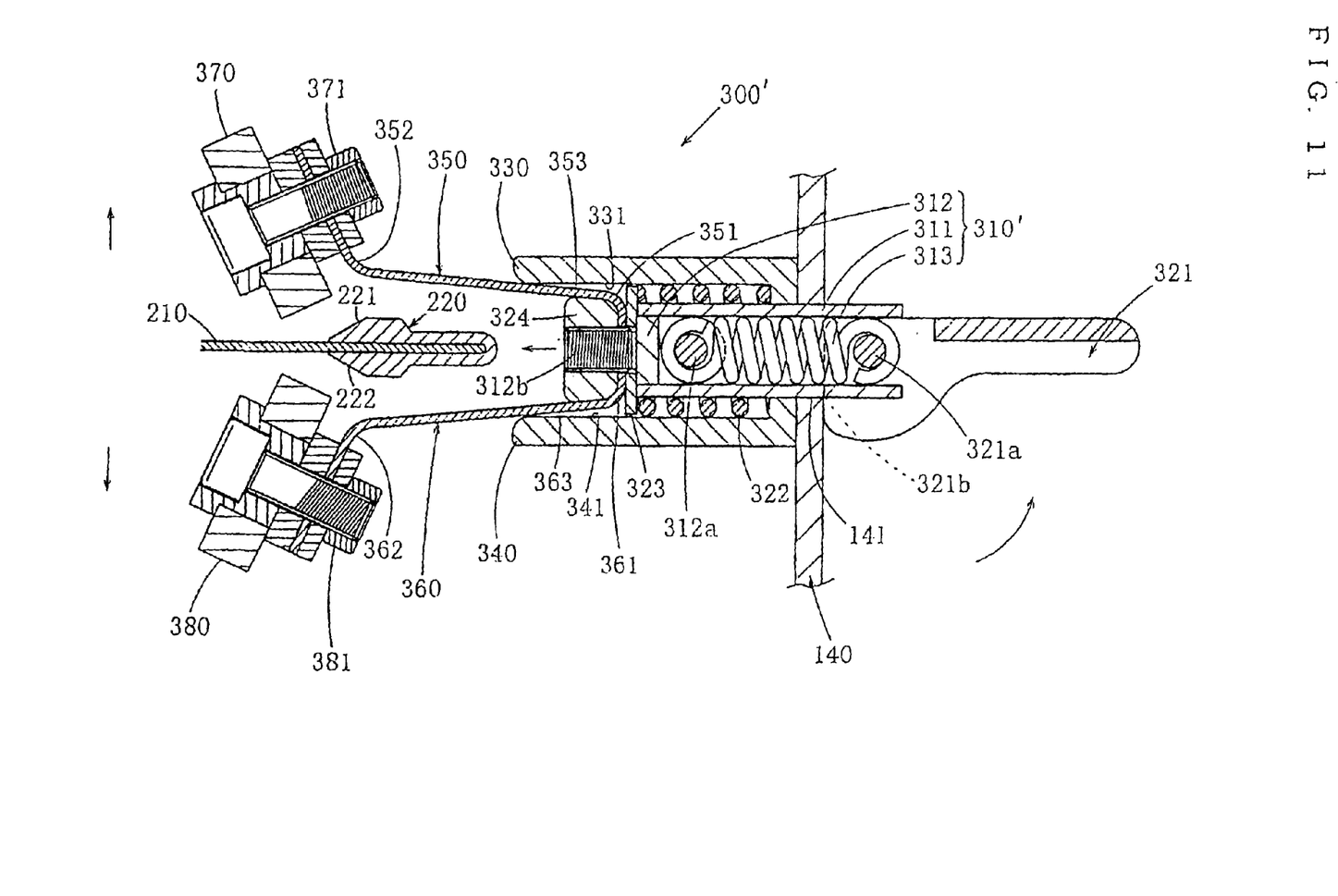
FIG. 11 is an enlarged vertical cross-section of the support apparatus of the second embodiment during removal and installation of the curved belt.

Specifically, the slider 310' includes a body member 311 that may be moved in the direction of the radial inner edge of the curved belt 200 when operated, a movable member 312 that is movably mounted to the body member 311 such that it can move in the radial directions of the curved belt 200, and an elastic member 313 located between the body member 311 and the movable member 312. The body member 311 is a cylindrical member that passes through a through hole 141 that is drilled through the frame 140 in the radial direction of the curved belt 200, and can be moved in both radial directions of the curved belt 200. An operation lever 321 is rotatably linked to the part of the body member 311 that extends outside the radial outer edge of the curved belt 200 beyond the frame 140, such that it revolves around a rotation shaft 321a that is perpendicular to the radial direction of the curved belt 200. A cam surface that comes into contact with the frame 140 is located on the operation lever 321. The cam surface has a first cam surface 321b and a second cam surface 321c that is contiguous with the first cam surface 321b and is closer to the rotation shaft 321a than the first cam surface 321b. When the curved conveyor 100 is moving, the first cam surface 321b is in contact with the frame 140, while when the operation lever 321 is operated by being rotated so as to remove or install the curved belt 200, the second cam surface 321c comes into contact with the frame 140, and the slider 310' moves in the direction of the radial inner edge of the curved belt 200. The movable member 312 passes through the center of the body member 311 such that it may slide therein in the radial directions of the curved belt 200, as if it were a piston inside the body member 311 comprising the cylinder. An elastic member 313 is mounted between the body member 311 and the movable member 312. In this embodiment, the elastic member 313 is a coil spring. The hooks at either end of the elastic member 313 respectively engage with a pin 312a located on the outer surface of the movable member 312 in terms of the radial direction of the curved belt 200, and with a rotation shaft 321a by which the operation lever 321 is mounted to the body member 311. A force-applying member 322 is mounted between the body member 311 and the frame 140, and assists in the movement of the body member 311 in the direction of the radial inner edge of the curved belt 200. In this embodiment, the force-applying member 322 is a coil spring that engages with the outer surface of the body member 311 and is mounted between the frame 140 and a washer 323 while being compressed. The upper arm 350 and the lower arm 360 are connected at the root ends 351 and 361, respectively, so that the upper and lower arms are integrally formed. The upper arm 350 and the lower arm 360 are detachably connected to the slider 310' via a screw. In this embodiment, a male screw 312b is formed in the top end of the movable member 312, and after a washer 323 is slid over the male screw 312b and a through hole formed in the connection area of the root ends 351 and 361 of the upper arm 350 and lower arm 360 passes over the male screw 312b, a nut 324 tightens over the male screw 312b.

The second embodiment has the same action and effect as the first embodiment. Furthermore, in this embodiment, through the elastic deformation of the elastic member 313, the movable member 312 moves in the radial directions of the curved belt 200 relative to the body member 311, and because as a result the upper guide roller 370 and the lower guide roller 380 also move in the radial directions of the curved belt 200, fluctuations in the load applied to the curved belt 200 in the radial directions are absorbed, thereby prolonging the useful life of the curved belt 200. This is particularly effective when the curved belt 200 is subject to wavy movement.

Figure 12:
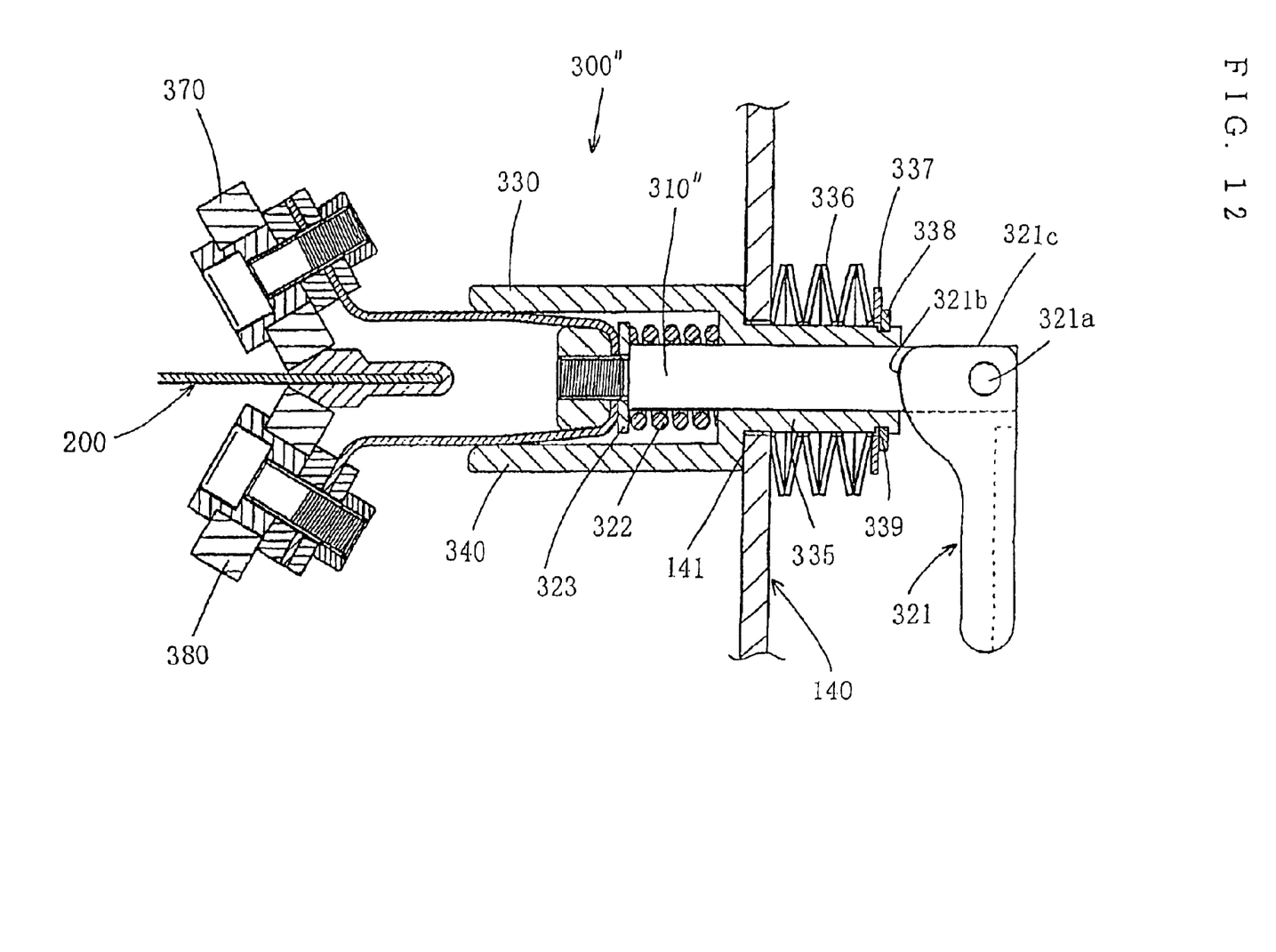
FIG. 12 is an enlarged vertical cross-section of a support apparatus according to a third embodiment when the curved conveyor is moving.

FIG. 12 shows a curved conveyor having a curved belt support apparatus 300'' of a third embodiment. Members serving the same functions as those in the first and second embodiments are assigned the same numbers. The explanation of the first and second embodiments applies in principle, and only the points that differ will be described below. The support apparatus 300'' of this embodiment elastically supports the upper guide roller 370 and the lower guide roller 380 such that they can also move in the radial directions of the curved belt 200.

Specifically, the upper guide member 330 and the lower guide member 340 which are formed essentially in the shape of horizontal plates are integrally formed with a body member 335. The body member 335 is a cylindrical member that passes through a through hole 141 that is drilled through the frame 140 in the radial direction of the curved belt 200, and can be moved in the radial direction of the curved belt 200.

A slider 310'' passes through the center of the body member 335 in the radial direction of the curved belt 200, and can move in both radial directions of the curved belt 200. An operation lever 321 is rotatably mounted to the part of the slider 310'' that extends outside the radial outer edge of the curved belt 200 beyond the body member 335, such that it revolves around a rotation shaft 321a that is perpendicular to the radial direction of the curved belt 200. A cam surface that comes into contact with the body member 335 is located on the operation lever 321. The cam surface has a first cam surface 321b and a second cam surface 321c that is contiguous with the first cam surface 321b and is closer to the rotation shaft 321a than the first cam surface 321b. When the curved conveyor 100 is moving, the first cam surface 321b is in contact with the body member 335, while when the operation lever 321 is operated by being rotated in order to remove or install the curved belt 200, the second cam surface 321c comes into contact with the body member 335, and the slider 310'' moves in the direction of the radial inner edge of the curved belt 200. A force-applying member 322 is mounted between the slider 310'' and the body member 335, and assists in the movement of the slider 310'' in the direction of the radial inner edge of the curved belt 200. In this embodiment, the force-applying member is a coil spring that engages with the outer surface of the slider 310'' and is mounted between the body member 335 and a washer 323.

An elastic member 336 is mounted between the frame 140 and the body member 335, and pretensions the body member 335 in the direction away from the curved belt 200. In this embodiment, the elastic member is a stack of conical spring washers that engages with the frame 140 and a washer 337 which rests against a disk 338 which is hold in an annular groove 339 of the body member 335.

The third embodiment has the same action and effect as the second embodiment. Through an elastic deformation of the elastic member 336, the body member 335 can move in the radial directions of the curved belt 200 relative to the frame 140, and because as a result the upper guide roller 370 and the lower guide roller 380 can also move in the radial directions of the curved belt 200, fluctuations in the load applied to the curved belt 200 in the radial directions can be absorbed, thereby prolonging the useful life of the curved belt 200. This is particularly effective when the curved belt 200 is subject to wavy movement.

The present invention includes all embodiments combining the features of the different embodiments above.

What is claimed is:

1. A curved belt support apparatus that prevents a curved belt from moving inward by supporting a thick part of the curved belt that thickens in both vertical directions at the outer edge of the belt, wherein an upper guide roller is brought in contact with the upper inside surface of the thick part of the belt, a lower guide roller is brought in contact with the lower inside surface of the thick part of the belt, and the upper and lower guide rollers are elastically supported such that they can elastically move up and down; and wherein, when operated, the upper guide roller is moved diagonally upward in the direction of the radial inner edge of the curved belt while the lower guide roller is moved diagonally downward in the direction of the radial inner edge of the curved belt so that the upper and lower guide rollers are separated from the thick part of the belt .

2. The curved belt support apparatus according to claim 1, characterized in that the upper and lower guide rollers are elastically supported such that they can also move in the radial directions of the curved belt.

3. A curved belt support apparatus that prevents a curved belt from moving inward by supporting a thick part of the curved belt that thickens in both vertical directions at the outer edge of the belt, wherein an upper guide roller is brought in contact with the upper inside surface of the thick part of the belt, a lower guide roller is brought in contact with the lower inside surface of the thick part of the belt, and the upper and lower guide rollers are elastically supported such that they can move up and down; and wherein, when operated, the upper guide roller is moved diagonally upward in the direction of the radial inner edge of the curved belt while the lower guide roller is moved diagonally downward in the direction of the radial inner edge of the curved belt so that the upper and lower guide rollers are separated from the thick part of the belt; a slider provided outside the curved belt, in its radial direction such that, when operated, the slider moves in the direction of the radial inner edge of the curved belt; upper and lower guide members provided above and below the slider, respectively; an upper arm the root end of which is connected to the slider, the top end of which extends in the direction of the radial inner edge of the curved belt beyond the upper guide member and is elastically movable up and down, and a slanted part of the upper surface of which is slanted diagonally upward in the direction of the radial inner edge of the curved belt, so that the slanted part comes into contact with the bottom surface of the upper guide member whereby its elastic return in the upward direction is regulated; a lower arm the root end of which is connected to the slider, the top end of which extends in the direction of the radial inner edge of the curved belt beyond the lower guide member and is elastically movable up and down, and a slanted part of the lower surface of which is slanted diagonally downward in the direction of the radial inner edge of the curved belt, so that the slanted part comes into contact with the top surface of the lower guide member whereby its elastic return in the downward direction is regulated; wherein the upper guide roller is provided at the top end of the upper arm and the lower guide roller is provided at the top end of the lower arm.

4. A curved belt support apparatus according to claim 3, characterized in that the slider comprises a body member that, when operated, moves in then direction of the radial inner edge of the curved belt, a movable member movably provided on the body member so as to be movable in the radial direction of the curved belt, and an elastic member provided between the body member and the movable member.

5. The curved belt support apparatus according to claim 4, characterized in that the elastic member is a coil spring.

6. The curved belt support apparatus (300") according to claim 3, characterized in that it comprises: a body member (335) which is movable in the radial direction of the curved belt (200), through which the slider (310") passes and to which the upper guide member (330) and the lower guide member (340) are linked; and an elastic member (336) pretensioning the body member (335) in the direction away from the curved belt (200).

7. The curved support apparatus (300") according to claim 6, characterized in that the upper guide member (336) is a stack of conical spring washers or a coil spring.

8. The curved support apparatus (300") according to claim 6, characterized in that the upper guide member (330) and the lower guide member (340) are integrally formed with the body member (335).

9. The curved belt support apparatus according to claim 3, characterized in that the upper and lower arms are linked at the root ends thereof.

* * * * *

UNITED STATES PATENT AND TRADEMARK OFFICE
CERTIFICATE OF CORRECTION

PATENT NO. : 6,962,252 B2
DATED : November 8, 2005
INVENTOR(S) : Hiroaki Fujiwara et al.

It is certified that error appears in the above-identified patent and that said Letters Patent is hereby corrected as shown below:

Column 12,
Line 13, "A" should read -- The --;
Line 15, "then" should read -- the --;
Line 18, "direction" should read -- directions --;
Line 32, "upper guide" should read -- elastic --.

Signed and Sealed this

Twenty-fourth Day of January, 2006

JON W. DUDAS
*Director of the United States Patent and Trademark Office*